(12) United States Patent
Nee

(10) Patent No.: US 11,630,191 B2
(45) Date of Patent: Apr. 18, 2023

(54) MOBILE SUPPORT PLATFORM FOR CALIBRATING A VEHICLE

(71) Applicant: GM Cruise Holdings LLC, San Francisco, CA (US)

(72) Inventor: James Nee, San Francisco, CA (US)

(73) Assignee: GM Cruise Holdings LLC., San Francisco, CA (US)

( * ) Notice: Subject to any disclaimer, the term of this patent is extended or adjusted under 35 U.S.C. 154(b) by 672 days.

(21) Appl. No.: 16/456,402

(22) Filed: Jun. 28, 2019

(65) Prior Publication Data

US 2020/0408889 A1 Dec. 31, 2020

(51) Int. Cl.
| | | |
|---|---|---|
| G01S 7/52 | (2006.01) | |
| G01C 21/30 | (2006.01) | |
| G01C 25/00 | (2006.01) | |
| G05D 1/00 | (2006.01) | |
| G05D 1/02 | (2020.01) | |
| G01S 13/87 | (2006.01) | |
| H04W 4/029 | (2018.01) | |

(52) U.S. Cl.
CPC .......... *G01S 7/52004* (2013.01); *G01C 21/30* (2013.01); *G01C 25/00* (2013.01); *G01S 13/87* (2013.01); *G05D 1/0022* (2013.01); *G05D 1/0214* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 2013/0123983 A1* | 5/2013 | Brogardh | B25J 9/1692 |
| | | | 700/254 |
| 2018/0081361 A1* | 3/2018 | Robinson | G01C 19/34 |
| 2019/0204427 A1* | 7/2019 | Abari | G01S 7/497 |

FOREIGN PATENT DOCUMENTS

CN 110053014 A * 7/2019

* cited by examiner

*Primary Examiner* — Hovhannes Baghdasaryan
(74) *Attorney, Agent, or Firm* — Polsinelli PC

(57) ABSTRACT

Various aspects of the subject technology relate to a mobile support platform for vehicle sensor calibration. The mobile support platform includes a chassis, lift posts on the chassis configured to interface with one or more lift points on a vehicle and raise the vehicle, and a set of wheels mounted to the chassis configured to carry the vehicle through a calibration sequence.

20 Claims, 9 Drawing Sheets

Mobile Support Platform 500
(Underside View)

Mobile Support Platform 500
(Side Profile View)

MOBILE SUPPORT PLATFORM FOR CALIBRATING A VEHICLE

TECHNICAL FIELD

The present invention generally pertains to calibration of sensors that are used by vehicles. More specifically, the present invention pertains to a mobile support platform configured to carry a vehicle through a calibration sequence.

BACKGROUND

An autonomous vehicle is a motorized vehicle that can navigate without a human driver. An exemplary autonomous vehicle includes a plurality of sensor systems, such as, but not limited to, a camera sensor system, a light detection and ranging (LIDAR) sensor system, or a radio detection and ranging (RADAR) sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system. Such sensors may also be mounted on other vehicles, such as vehicles that are used to generate or update street maps as they drive.

Some vehicles use multiple sensors of the same given type, such as multiple radar sensors, so that the vehicle has a larger field of view than a single such sensor would ordinarily provide. In such cases, the different sensors of the given type may each be slightly different. For example, one sensor of the given type may be made by a different manufacturer, or may be a different model or version, than another sensor of the given type. Additionally, one sensor of the given type may have a clear and unobstructed view of the environment around the vehicle, while another sensor of the given type may have a view that is at least partially occluded or weakened due to signals having to pass through a substrate such as a lens, or part of the body the vehicle. Furthermore, manufacturing defects or other discrepancies can exist in sensors, in vehicles, and/or in mounting hardware that affixes the sensors to the vehicles. Vehicle sensors of a given type can drift even further apart in their measurements due to exposure to the elements, for example through exposure to heat, rain, dust, frost, rocks, pollution, vehicular collisions, all of which can further impact a particular sensor's measurements, and which some sensors may be more susceptible to than others.

All of these differences between different sensors of a given type on a particular vehicle can lead to differences in sensor measurements across the vehicle's field of view that are not representative of reality. Because of this, the vehicle might not detect a pedestrian or another vehicle depending on where the pedestrian or other vehicle in the vehicle's field of view. Likewise, the vehicle might believe that it sees a pedestrian or other vehicle where none exist, due to over-emphasized noise. Because autonomous vehicles are trusted with human lives, it is imperative that autonomous vehicles have as robust an understanding of their environments as possible, otherwise a vehicle might perform an action that it should not perform, or fail to perform an action that it should perform, either of which can result in a vehicular accident and put human lives at risk. Other sensor-laden vehicles, such as those that collect data for maps or street-level imagery, can produce unreliable maps or images if they cannot account for the properties of their sensors, which can then in turn confuse both human vehicles and autonomous vehicles that rely on those maps, again risking human life.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
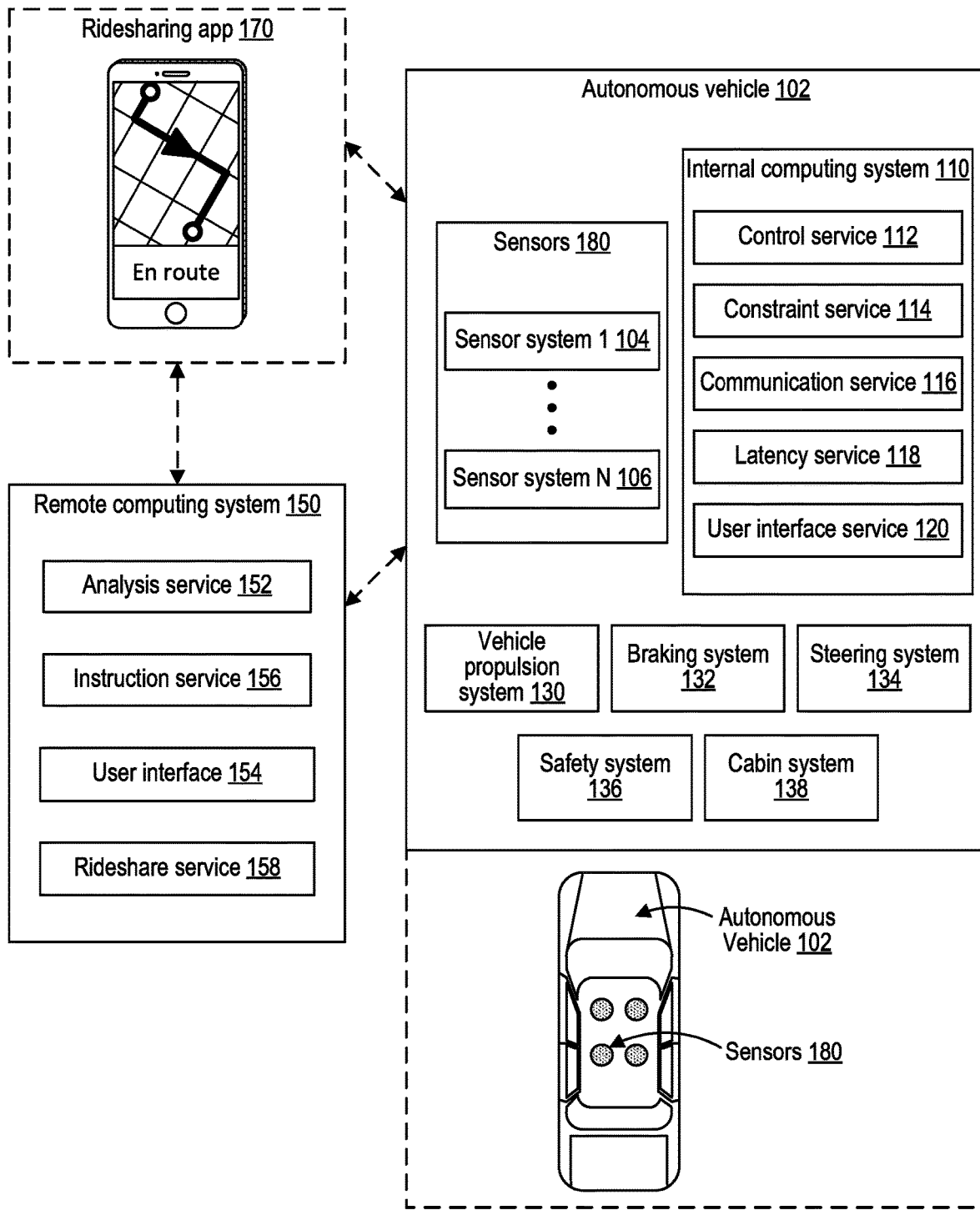
FIG. 1 illustrates an autonomous vehicle and remote computing system architecture, in accordance with various aspects of the subject technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

Calibration of the sensors of an autonomous vehicle is an important step to ensure high levels of safety, reliability, and effectiveness. The calibration process of an autonomous vehicle may include many different steps and operations that require a lot of time and resources. For example, the calibration process may involve exposing the sensors and/or the autonomous vehicle to a multitude of environments. This may be done by driving the vehicle through an environment or putting the vehicle on a turntable platform. Many calibration processes involve multiple states that may involve both driving through an environment, the turntable environment, or both in addition to other stages.

Each of these stages comes with their own difficulties. For example, driving a vehicle through an environment may be inexact, especially for the purposes of calibrating precision sensors. Turntable platforms, on the other hand, require large capital investments to produce a precisely level ground and adequate substrate for installation of a permanent turntable platform. Transitioning from one stage to another also requires time and effort such as aligning a vehicle, positioning the vehicle on a turntable platform, removing the vehicle from the vehicle platform, repositioning sensor targets, and the like. The transitioning from, for example, a driving stage to a turntable stage also introduces additional variables that are difficult to account for in calibration. The calibration process, including the transitions from and to different stages, also includes a lot of large and heavy moving objects, one of which is a vehicle capable of quick acceleration that has not completed calibration. These conditions create an environment where safety can be improved. Finally, the calibration process involves a large amount of equipment (e.g., the turntable platform), that is permanently cemented or bolted into the ground. As a result, it is difficult to deploy in new environments where there is an immediate (and potentially temporary) need.

Aspects of the subject technology solve these and other technical issues by providing a mobile support platform for calibrating a vehicle. The mobile support platform may include a chassis, a set of wheels mounted to the chassis, lift posts on the chassis configured to interface with one or more lift points on a vehicle, and a controller configured to raise the vehicle via the lift posts and perform a calibration sequence. The mobile support platform enables vehicle calibration to be performed in a larger variety of environments (e.g., environments without level ground) and/or without having to engineer an environment to meet restrictive requirements. The mobile support platform also allows for greater control of the calibration process with fewer uncontrolled variables with or without transitioning through one or more stages of calibration. The greater control may allow for fewer mistakes in calibration, more accurate calibration, and fewer safety concerns. Additionally, the mobile support platform need not be attached to the ground like a turntable and, as a result, is much more portable and transportable. The mobile support platform may be packed up, shipped, and deployed faster, with less expense, and with less materials and support than other calibration methods.

FIG. 1 illustrates an autonomous vehicle and remote computing system architecture, in accordance with various aspects of the subject technology. The autonomous vehicle 102 can navigate about roadways without a human driver based upon sensor signals output by sensor systems 180 of the autonomous vehicle 102. The autonomous vehicle 102 includes a plurality of sensor systems 180 (a first sensor system 104 through an Nth sensor system 106). The sensor systems 180 are of different types and are arranged about the autonomous vehicle 102. For example, the first sensor system 104 may be a camera sensor system and the Nth sensor system 106 may be a Light Detection and Ranging (LIDAR) sensor system. Other exemplary sensor systems include radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems such as Global Positioning System (GPS) receiver systems, accelerometers, gyroscopes, inertial measurement units (IMU), infrared sensor systems, laser rangefinder systems, ultrasonic sensor systems, infrasonic sensor systems, microphones, or a combination thereof. While four sensors 180 are illustrated coupled to the autonomous vehicle 102, it should be understood that more or fewer sensors may be coupled to the autonomous vehicle 102.

Note that while the sensors 180 of the vehicle 102 of FIG. 1 are illustrated as uniform and as mounted or otherwise coupled to the roof of the vehicle 102, different types of sensors 180 may be used, and different sensors 180 may be positioned along, or coupled to, different portions of the vehicle 102. For example, one or more sensors may be coupled to the left and right side/wing/door/fender mirrors of the vehicle 102, respectively, while one or more central sensors may be coupled to or hidden behind a front bumper of the vehicle 102. Some sensors 180 may be located along or coupled to the interior of the vehicle, for example behind the windshield or to the interior rear-view mirror. The vehicle 102 may have sensors located along the roof, doors, walls, windows, bumpers, anywhere along the top and/or bottom and/or front and/or left side and/or right side and/or rear of the vehicle, or any combination thereof.

Furthermore, different sensors of a given type, such as of a radar sensor type, may each be slightly different. For example, one sensor of the given type may be made by a different manufacturer, or may be a different model or version, than another sensor of the given type. One sensor may run (and/or interact with one or more a computing systems 1500 running) a different firmware, operating system (OS), basic input/output system (BIOS), software, or some combination thereof compared to another sensor. Furthermore, manufacturing defects or other discrepancies can exist in sensors, in vehicles, and/or in mounting hardware that affixes the sensors to the vehicles, which can cause differences between otherwise identical sensors. Vehicle sensors of a given type can drift even further apart in their measurements due to exposure to the elements, for example through exposure to heat, rain, dust, frost, rocks, pollution, vehicular collisions, all of which can further impact a particular sensor's measurements even with all else being equal. Some sensors may be more susceptible to, or may be more shielded from, or may react differently to, such environmental or accident-caused effects than others, meaning that sensors subjected to the same conditions will not necessarily be affected in the same way or to the same degree.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. In some cases, the braking system 132 may charge a battery of the vehicle through regenerative braking. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an internal computing system 110 that is in communication with the sensor systems 180 and the systems 130, 132, 134, 136, and 138. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 180 and human co-pilots, etc.

The internal computing system 110 can include a control service 112 that is configured to control operation of the vehicle propulsion system 130, the braking system 208, the steering system 134, the safety system 136, and the cabin system 138. The control service 112 receives sensor signals from the sensor systems 180 as well communicates with other services of the internal computing system 110 to effectuate operation of the autonomous vehicle 102. In some embodiments, control service 112 may carry out operations in concert one or more other systems of autonomous vehicle 102.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 4G, 5G, etc.) communication.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system 150, software service updates, ridesharing pickup and drop off instructions etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations. The internal computing system 110 can, in some cases, include at least one computing system, or may include at least a subset of the components discussed with respect to computing systems.

As described above, the remote computing system 150 is configured to send/receive a signal from the autonomous vehicle 140 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc.

The rideshare service 158 as depicted in FIG. 1 illustrates a vehicle 102 as a triangle en route from a start point of a trip to an end point of a trip, both of which are illustrated as circular endpoints of a thick line representing a route traveled by the vehicle. The route may be the path of the vehicle from picking up the passenger to dropping off the passenger (or another passenger in the vehicle), or it may be the path of the vehicle from its current location to picking up another passenger. The remote computing system 150 can, in some cases, include at least one computing system or may include at least a subset of the components discussed with respect to computing systems.

Figure 2:
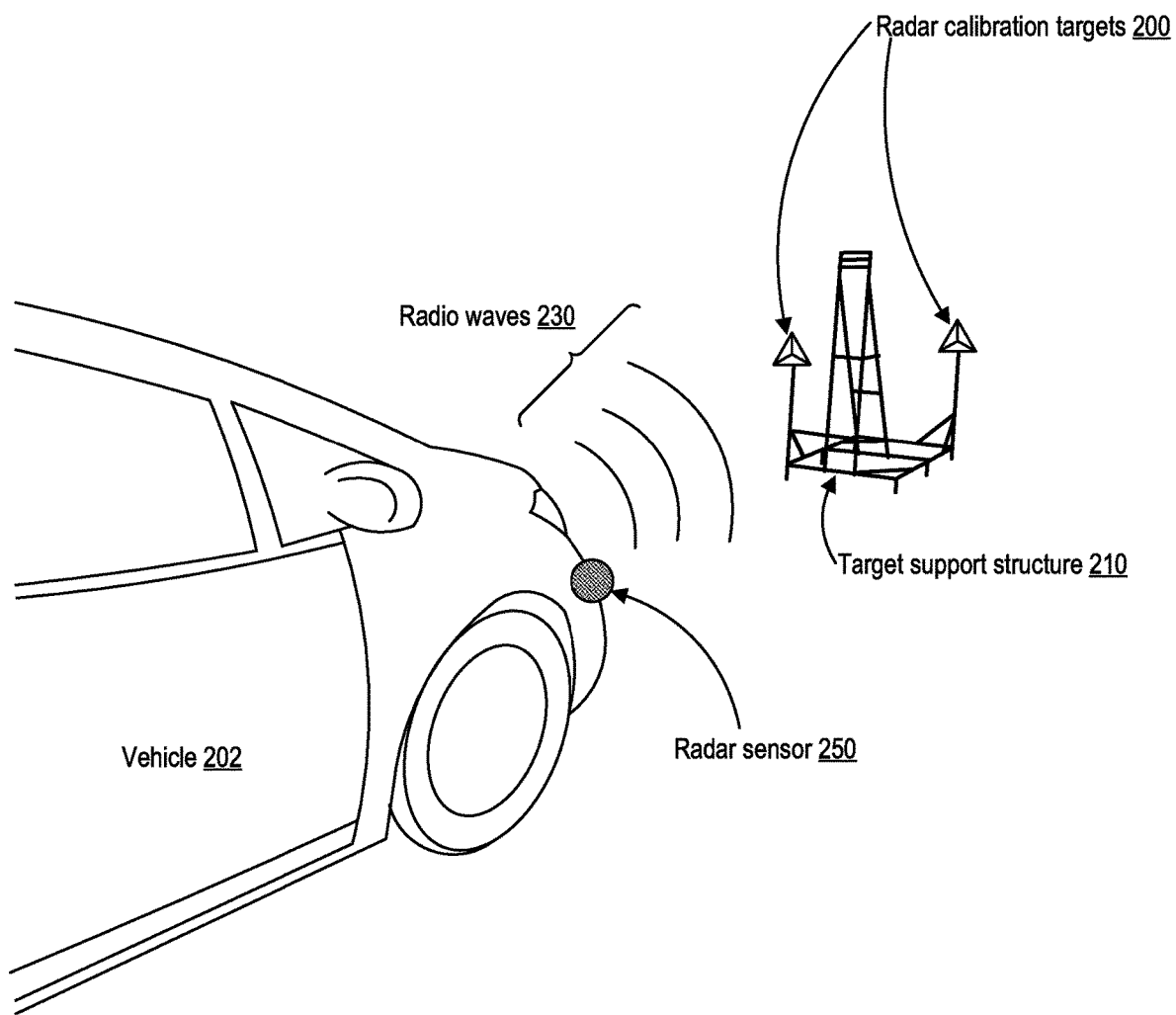
FIG. 2 illustrates a perspective view of a vehicle using one or more radar sensors to detect two radar sensor calibration targets set up in a calibration environment, in accordance with various aspects of the subject technology.

As part of the calibration process for a vehicle 102, the vehicle 102 may be placed in a calibration environment with sensor calibration targets for testing and calibrating the sensors 180 of the vehicle 102. FIG. 2 illustrates a perspective view of a vehicle using one or more radar sensors to detect two radar sensor calibration targets set up in a calibration environment, in accordance with various aspects of the subject technology. The calibration environment in FIG. 2 is illustrated with two radar calibration targets 200 affixed/coupled to a target support structure 210. Although FIG. 2 illustrates radar calibration targets 200, other types of sensor targets (e.g., LIDAR, SONAR, and/or SODAR targets) may also be used in addition to or instead of the radar calibration targets 200.

The target support structure 210 used in FIG. 2 may be made of, or include, any material, such as paper, cardboard, plastic, metal, foam, any material discussed with respect to a substrate, or some combination thereof. In some cases, certain stands may be at least partially made of, or include, a plastic such polyvinyl chloride (PVC) to avoid detection by certain types of range sensors, such as radar sensors, which detect metal better than they detect plastic.

The sensors of the vehicle 202 of FIG. 2 include one or more radar sensors 250, which include one or more radio transmitters and one or more radio receivers, and/or one or more radio transceivers. The radio transmitter(s) or transceiver(s) of the radar sensor(s) 250 of the vehicle 202 emit one or more radio waves 230, whose reflections/backscatter (not pictured) are received by the radio receiver(s) or transceiver(s) of the radar sensor(s) 250 of the vehicle 202. Based on receipt of the reflections by the radio receiver(s) or transceiver(s), the radar sensor(s) 350 and/or the internal computer coupled thereto detect the presence of the targets 200 by detecting radar cross section (RCS), a measure of the ratio of backscatter density in the direction of the radar (from the target) to the power density that is intercepted by the target.

Figure 3:
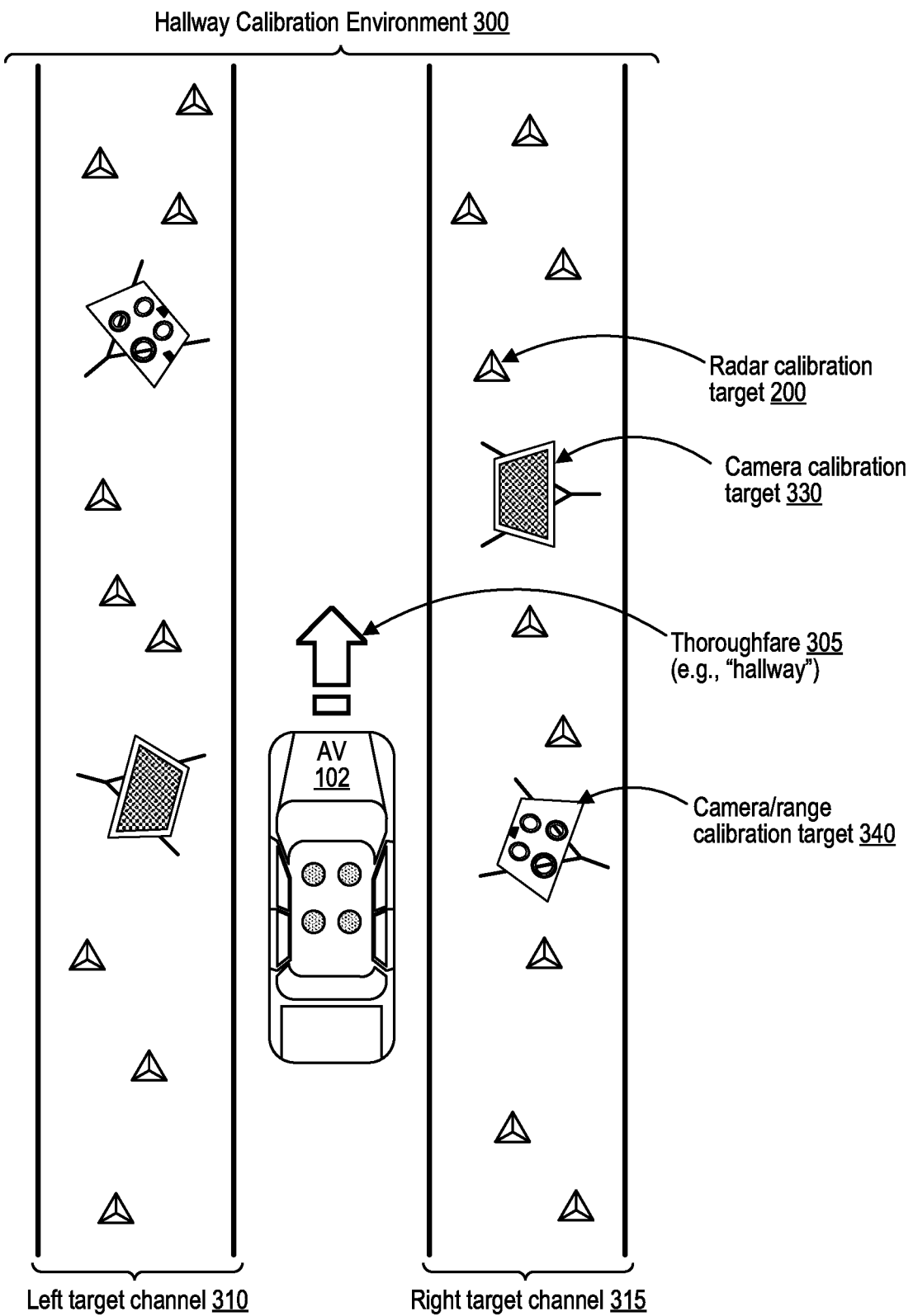
FIG. 3 illustrates a top-down view of a hallway calibration environment in which a vehicle traverses a throughfare along which the vehicle is flanked by vehicle sensor calibration targets.

FIG. 3 illustrates a top-down view of a hallway calibration environment in which a vehicle traverses a throughfare along which the vehicle is flanked by vehicle sensor calibration targets, in accordance with various aspects of the subject technology. The hallway calibration environment 300, which may also be referred to as a tunnel calibration environment, includes a thoroughfare 305 through which a vehicle drives, the thoroughfare 305 flanked on either side by targets detectable by the sensors 180 of the vehicle. The thoroughfare 305 may also be referred to as the drive path, the drive channel, the hallway, or the tunnel. Some of the targets are arranged in a left target channel 310 that is to the left of the vehicle as the vehicle traverses the thoroughfare 305. Others of the targets are arranged in a right target channel 315 that is to the right of the vehicle as the vehicle traverses the thoroughfare 305.

In FIG. 3, the targets in the left target channel 310 and right target channel 315 include radar calibration targets as illustrated in and discussed with respect to FIG. 2, but also include other types of targets, such as camera calibration targets 330 and combined camera/range calibration targets 340. The camera calibration targets 330 include patterns such as checkerboards, ArUco patterns, quick response (QR) code patterns, barcode patterns, or crosshair patterns, printed onto planar substrates, and may be used to calibrate cameras among the vehicle 102's sensors 180, for example by identifying how a camera lens is warped based on identifying how a grid corresponding to a checkerboard, ArUco pattern, or QR code pattern is warped in the resulting image of such a camera calibration target 330.

The combined camera/range calibration targets 340 may include four circular cutouts from a substrate, one cutout smaller than the other three cutouts, each cutout surrounded by a high-contrast (e.g., black on a white substrate or vice versa) circular ring visual marking. The combined camera/range calibration targets 340 may also include target identifier markings, illustrated in FIG. 3 as black squares centered along on one or more sides of the substrate of the target, which may serve to identify one target from another. The vehicle can detect the combined camera/range extrinsic calibration targets 340 using both its range sensors (e.g., LIDAR or any other range sensor discussed herein) and using its cameras by detecting the circular cutouts with the range sensors and the rings/markings around the cutouts and the target identifier markings with the cameras. In doing so, the vehicle and its computer can detect a center of the circular cutout easily, since range sensors such as lidar typically provide a point cloud of depth measurements that can help identify where the narrowest and widest parts of each circle are. The visually marked circular rings detected by the camera have the same centers as the circular cutouts do, so the center of each circular cutout as determined based on range sensor data is the same as the center of each visually marked circular ring. The range sensor and camera know they are looking at the exact same locations for each of these center points. Thus, the camera and range sensor may be extrinsically calibrated so that their positional awareness of the surroundings of the vehicle can be positionally aligned. The extrinsic calibration may, in some cases, output one or more matrices used for transforming a camera location to a range sensor location or vice versa, via translation, rotation, or other transformations in 3D space. The targets 330 and 340 illustrated in FIG. 3 are illustrated as each mounted on separate easel-style stands. Other types of stands are also possible.

Positioning of radar calibration targets 200 in clusters may similarly help intrinsically calibrate the radar sensors of the vehicle, and known positioning of the radar calibration targets 200 in the calibration environment relative to other targets (such as the camera calibration targets 330 and/or the combined camera/range calibration targets 340) may help extrinsically calibrate the radar sensors of the vehicle with respect to other sensors of the vehicle, such as camera and/or LIDAR.

During calibration of vehicle sensors, the vehicle 102 drives along the thoroughfare 305 in the hallway calibration environment 300, optionally stopping after incremental distance or time amounts. At each distance, the vehicle 102 captures data using each of its vehicle sensors, or at least each of the vehicle sensors that it intends to calibrate. The vehicle 102 stopping helps prevent issues caused by sensors running while the vehicle 102 is in motion, such as motion blur or rolling shutter issues in cameras. The vehicle 102 stopping also ensures that sensors can capture data while the vehicle 102 is in the same position, which may be important for extrinsic calibration of two or more sensors with respect to each other so that a location within data gathered by a first vehicle sensor (e.g., a range sensor such as a LIDAR or radar sensor) can be understood to correspond to a location within data gathered by a second vehicle sensor (e.g., a camera). The vehicle 102 may in some cases traverse the thoroughfare 305 multiple times.

In other cases, the vehicle 102 may drive along the thoroughfare 305 in the hallway calibration environment 300 continuously without stopping, and the vehicle 102 can capture data with its sensors continuously, or at various distance or time intervals without the vehicle 102 stopping. In some cases, a combination of these hallway calibration environment 300 sensor data gathering operations may be used, so that some sensor data is gathered from the sensors of the vehicle 102 while the vehicle is stopped at defined distance or time intervals, and other sensor data is gathered from the sensors of the vehicle 102 while the vehicle 102 is moving (optionally before, after, or in between stops). These data corresponding to the stopped vehicle 102 and corresponding to the moving vehicle 102 may then be considered either together or separately in the calibration process. While the thoroughfare 305 of the hallway calibration environment 300 of FIG. 3 is a straight path, in some cases it may be a curved path, and by extension the left target channel 310 and right target channel 315 may be curved to follow the path of the thoroughfare 305.

While the hallway calibration environment 300 is effective in providing an environment with which to calibrate the sensors 180 of the vehicle 102, it is inefficient in some ways. For example, driving the vehicle 102 through the hallway calibration environment 300 may be difficult to keep consistent. For example, different vehicles 102 might be aligned slightly differently in the thoroughfare 102, drive a slightly different path through the thoroughfare 102, drive at different speeds, stop at slightly different spots, and/or frequencies along the drive. These differences may be the result of manufacturing or equipment (e.g., tires, drive train, etc.) differences in the vehicle 102 or due to human error in setting the vehicle 102 up, all of which affects consistency of the calibration. Trying to correct for all of these potential inconsistencies, and turning the vehicle around to move it through the hallway calibration environment 300 multiple times, is time and labor intensive, making the hallway calibration environment 300 time-inefficient.

Aspects of the subject technology solve these and other technical issues by providing a mobile support platform upon which the vehicle 102 may be positioned. The mobile support platform may be programmed with a calibration sequence and execute the calibration sequence while carrying the vehicle 102. By carrying the vehicle 102 through the calibration sequence, the mobile support platform is able to reduce the number of inconsistencies on calibrating the vehicle sensors. For example, because the movement of the vehicle 102 can be better controlled using the mobile support platform, the calibration results are more consistent across vehicles 102, which further allows calibration configurations of different vehicles 102 to be more readily compared and outliers identified as potentially symptomatic of a sensor defect or a miscalibration issue. Furthermore, use of the mobile support platform is more energy-efficient because the vehicle engine can be turned off after the vehicle is on the mobile support platform. In some embodiments, the vehicle or portions thereof need not be turned on because the mobile support platform may be configured to slide under the vehicle, align lift posts of the mobile support platform with lift points on the vehicle, and lift the vehicle without the vehicle needing to do anything.

Figure 4:
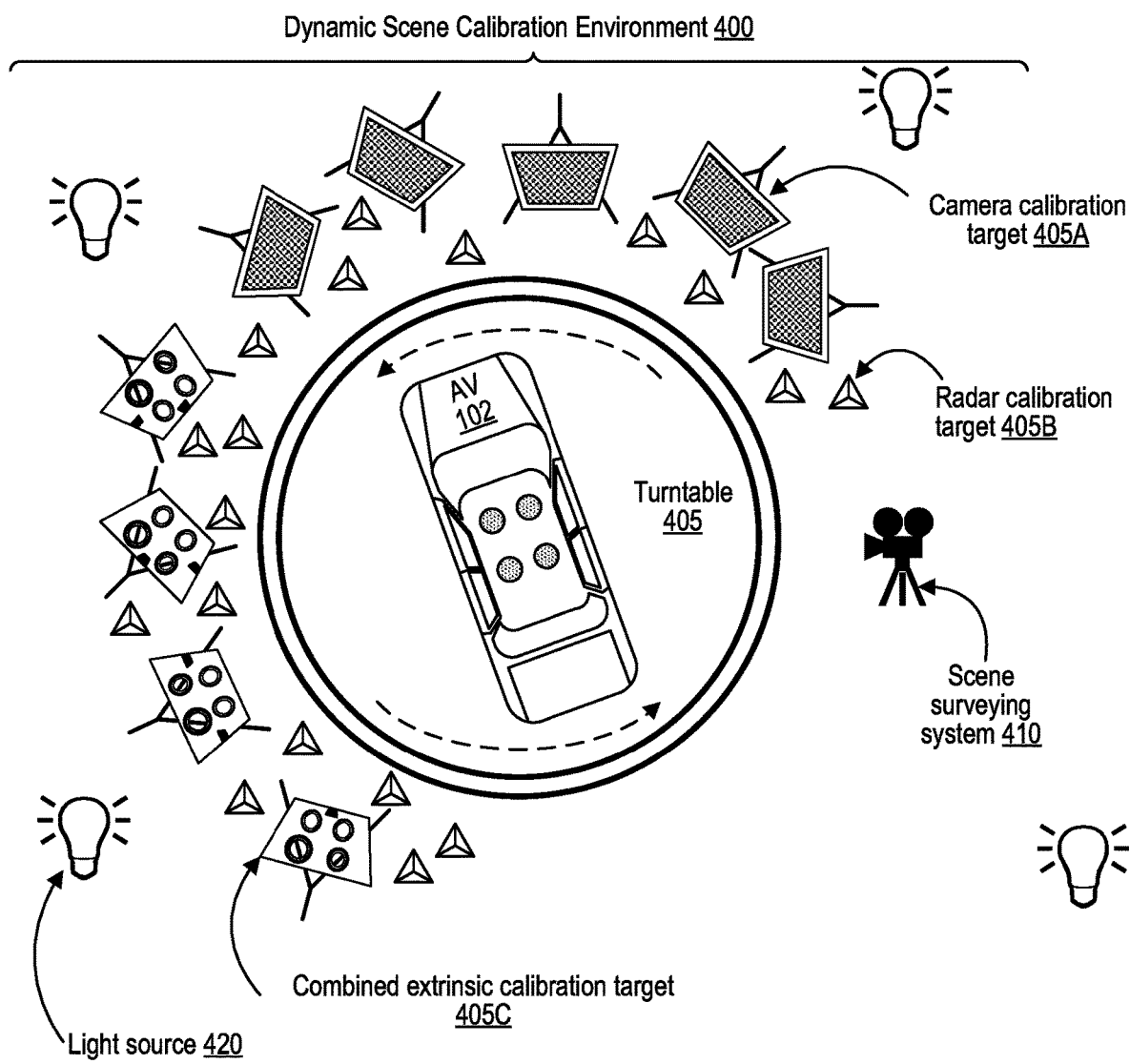
FIG. 4 illustrates a top-down view of a dynamic scene calibration environment with a turntable for performing calibration of vehicle sensors.

FIG. 4 illustrates a top-down view of a dynamic scene calibration environment 400 with a turntable (e.g., a turntable calibration environment) for performing calibration of vehicle sensors. The turntable calibration environment includes a motorized turntable 405 that is at least partially surrounded by vehicle camera and/or sensor calibration targets. A vehicle 102 is positioned on the motorized turntable 405 and the turntable 405 rotates a vehicle 102 so that intrinsic calibration of its camera sensors and/or extrinsic calibration of its sensors can be performed.

A variety of targets may be placed around the motorized turntable 405. For example, the targets may include checkerboard-patterned camera calibration targets 405A, and trihedral radar calibration targets 405B, combined extrinsic calibration targets 405C, or the like. The dynamic scene calibration environment 400 of FIG. 4 may also includes a scene surveying system 410, which may include one or more cameras and/or range sensors (e.g., radar, lidar, sonar, sodar, laser rangefinder). The scene surveying system 410 captures visual and/or range data of at least a subset of the dynamic scene calibration environment 400, including the motorized turntable 410, at least some of the targets, and the vehicle 102 itself. Key points on the vehicle 120 may be tracked to identify the current pose (rotation position) of the vehicle 102. Data captured by the scene surveying system 410 can also be sent to the vehicle 102 and used to verify the data captured by the sensors and the intrinsic and extrinsic calibrations performed based on this data. The dynamic scene calibration environment 400 also includes several light sources 420 set up around the turntable 405. The light sources 420 are used to improve readings from cameras of the vehicle and of the scene surveying system 410, and can in some cases be controlled wirelessly by the vehicle 102 and/or scene surveying system 410.

The motorized turntable 405, however, is quite large and expensive to manufacture, purchase, transport, prepare a site for installation, and install. The deployment of the motorized turntable 405 also requires specialized expertise. For example, the motorized turntable 405 may require level ground and a permanent power source. A construction crew is sometimes tasked to prepare a site for the turntable 405, lay cement, smooth the surface, make sure the surface is level, and provide a permanent power source. The turntable 405 may be shipped to the site and an installation crew may permanently install the turntable 405. This may involve heavy drilling and bolting of the turntable 405 to the surface. Not only is installation of the turntable expensive, complicated, and time consuming, repairs of the turntable 405 are similarly resource intensive. During the calibration process, positioning each vehicle on the turntable 405 and transitioning from or to the turntable from another location (e.g., another queue location or another calibration stage) is also time consuming as it requires moving the vehicle to a designated spot on the turntable. However, getting the vehicle in position is quite difficult, may require many tries, and may not be precise.

Aspects of the subject technology solve these and other technical issues by providing a mobile support platform for calibrating a vehicle. The mobile support platform may include a chassis, a set of wheels mounted to the chassis, lift posts on the chassis configured to interface with one or more lift points on a vehicle, and a controller configured to raise the vehicle via the lift posts and perform a calibration sequence. In some embodiments, the mobile support platform enables the calibration of vehicle sensors without a motorized turntable and enables calibration to be performed in a larger variety of environments and with less time, cost, and other resources. Furthermore, because the alignment of the vehicle 102 can be better controlled, the calibration results can be more consistent across vehicles 102, which further allows calibration configurations of different vehicles 102 to be more readily compared and outliers identified as potentially symptomatic of a sensor defect or a miscalibration issue. The mobile support platform is also more compact and portable. As a result, the mobile support platform may be deployed, packed up, transported, and redeployed in more locations and reused in a variety of different locations.

Figure 5A:
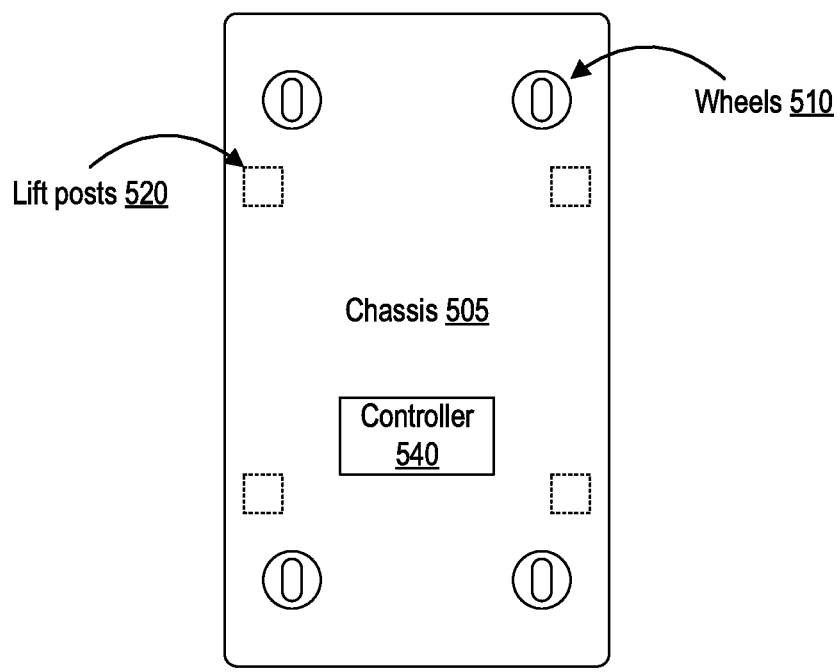
FIG. 5A and FIG. 5B are diagrams that illustrate two views of a mobile support platform, in accordance with various aspects of the subject technology.
Figure 5B:
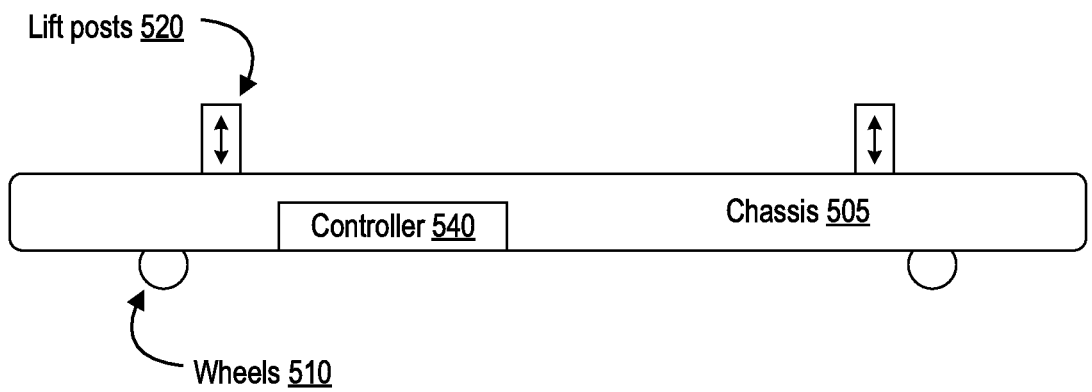

FIG. 5A and FIG. 5B are diagrams that illustrate two views of a mobile support platform 500, in accordance with various aspects of the subject technology. FIG. 5A shows an underside view of the mobile support platform 500 and FIG. 5B shows a side profile view of the mobile support platform 500. The mobile support platform 500 may include a chassis 505, a set of wheels 510, a set of lift posts 520, and a controller 530. FIGS. 5A and 5B are provided for illustrative purposes and although FIGS. 5A and 5B show the chassis 505, wheels 510, lift posts 520, and controller 530 in a particular location and configurations, other locations and configurations are also possible. Furthermore, the mobile support platform may include additional components, fewer components, and/or alternative components.

The chassis 505 is configured to support the other components of the mobile support platform 500 and be low lying such that the mobile support platform 500 may fit slide beneath the undercarriage of a vehicle. Although FIG. 5A shows the chassis 505 in a rectangular shape, the any other suitable shape may be used. In many embodiments, the length and/or width of the chassis 505 must be such that it can fit between a pair of the tires of a vehicle to allow for the mobile support platform 500 to slide between the wheels of one side of the vehicle, the front wheels of the vehicle, or the back wheels of the vehicle so that the mobile support platform 500 can position itself under one or more vehicles. As the dimensions of various vehicles are different, the dimensions of the chassis 505 and/or the mobile support platform 500 may also vary depending on configuration. In some embodiments, the chassis 505 of the mobile support platform 500 may also be dynamic in that in can shorten or elongate either in width or length to accommodate different models of vehicles. The chassis 505 may also include a set of wheel suspensions into which the wheels 510 are mounted.

The wheels 510 are mounted to the wheel suspensions of the chassis 505 and are configured to move the mobile support platform 500 in various directions. In some embodiments, the wheels 510 may be omnidirectional wheels (e.g., Mecanum wheels). The wheels 510, however, may also include multiple sets of wheels where each set of wheels is configured to move the mobile support platform 500 in different ways. The set of wheels 510 are configured to move the mobile support platform 500 in a controlled fashion along any axis parallel to the ground plane (e.g., forward and back, laterally, and rotationally). In various embodiments, the set of wheels 510 are configured to enable the mobile support platform 500 to have a zero point turning radius (e.g., the mobile support platform 500 is able to be rotated about a center point).

The lift posts 520 are mounted to the chassis 505 and configured to align with one or more lift points on a vehicle. The lift points on a vehicle may include, for example, dowel pin points, vehicle jack points, or any other location on the vehicle configured to aid in lifting the vehicle during the vehicle's manufacturing process, transport, or vehicular operation. The lift posts 520 are configured to align with the lift points on the vehicle and interface with the lift points in order to lift up the vehicle. In some embodiments, the interface between the lift posts 520 and the lift points of the vehicle allow for a secure fit that allows the vehicle to be moved (e.g., rotated) by the mobile support platform 500 at higher velocities without as much roll, which may affect the speed and/or accuracy of the sensor calibration process.

The controller 540 is configured to control the lift posts 520 and the wheels 510 and interface with other components of the mobile support platform 500 and/or the calibration environment. For example, the controller 540 may be configured to control the components of the mobile support platform 500 to cause the mobile support platform 500 to approach a vehicle, slide underneath the vehicle, align the lift posts 520 to lift points of the vehicle, raise the lift posts 520 to engage the lift points of the vehicle and raise the vehicle off the ground, and perform one or more calibration sequences. The calibration sequences may involve a hallway calibration environment (e.g., the hallway calibration environment 300 of FIG. 3), a dynamic scene calibration environment (e.g. the calibration environment 600 of FIG. 6), and/or other calibration environments. Furthermore, the calibration sequences may involve one or more stages of calibration. The steps of the calibration sequences may include moving the vehicle forward, back, and laterally, turning, and/or rotating. The movements may be continuous and gradual or involve stopping at multiple points in the process.

After the one or more calibration sequences are complete, the controller may cause the mobile support platform 500 to move the vehicle to a parking spot, lower the lift posts 520 to lower the vehicle to the ground and disengage the lift posts 520 with the lift points of the vehicle. The mobile support platform 500 may then slide out from under the vehicle and on to another task (e.g., performing calibration sequences with another vehicle). In some embodiments, multiple mobile support platforms may be used to speed up the calibration process for a large number of vehicles.

Although FIGS. 5A and 5B show the controller 540 as being on the chassis 505 of the mobile support platform 500, in other embodiments, the controller 540 or components of the controller 540 may be on one or more additional systems and/or locations as well. Furthermore, the processes performed by the controller 540 may be fully scripted and/or automated, partially automated, and/or controlled manually completely or partially via a control panel.

According to some embodiments, the mobile support platform 500 may also include additional components that may aid the mobile support platform 500 in performing various tasks. The additional components may include, for example, communications interfaces, sensors, cameras, power supply systems (e.g., batteries, generators, outlet plugs, etc.) or any other components that may be found on an autonomous vehicle. For example, front, back, and/or side facing cameras and/or sensors may be mounted to the chassis 505 of the mobile support platform 500 and aid in locating vehicles for calibration and performing calibration sequences. Top facing cameras and/or sensors may be mounted to the mobile support platform 500 to aid in aligning the lift posts of the mobile support platform 500 and the lift points of the vehicle. Bottom facing cameras and/or sensors may be mounted to the mobile support platform 500 to aid in locating and moving to exact locations in the calibration environment that have markings on the floor.

Figure 6:
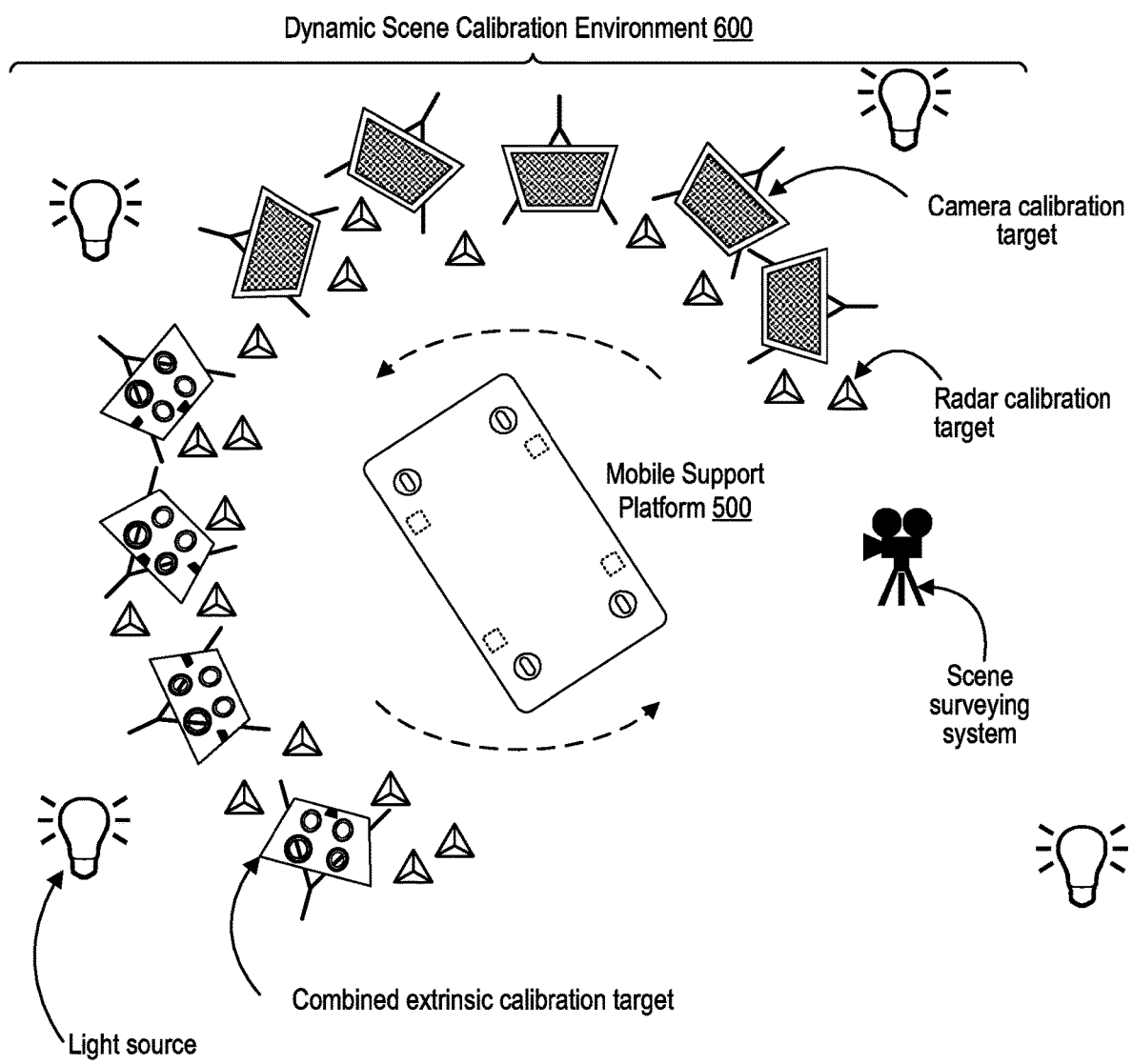
FIG. 6 is a diagram of one example calibration environment where the mobile support platform may be used, in accordance with various aspects of the subject technology.

FIG. 6 is a diagram of one example calibration environment where the mobile support platform 500 may be used, in accordance with various aspects of the subject technology. FIG. 6 illustrates a top-down view of a dynamic scene calibration environment 600 for performing calibration of vehicle sensors. The dynamic scene calibration environment 600 is compatible with the mobile support platform 500 carrying a vehicle and performing various calibration sequences (e.g., rotation steps) with the vehicle. The dynamic scene calibration environment 600 includes various vehicle camera and/or sensor calibration targets. A vehicle may be positioned on the mobile support platform 500 and carried through one or more calibration sequences so that calibration of its sensors can be performed.

Figure 7:
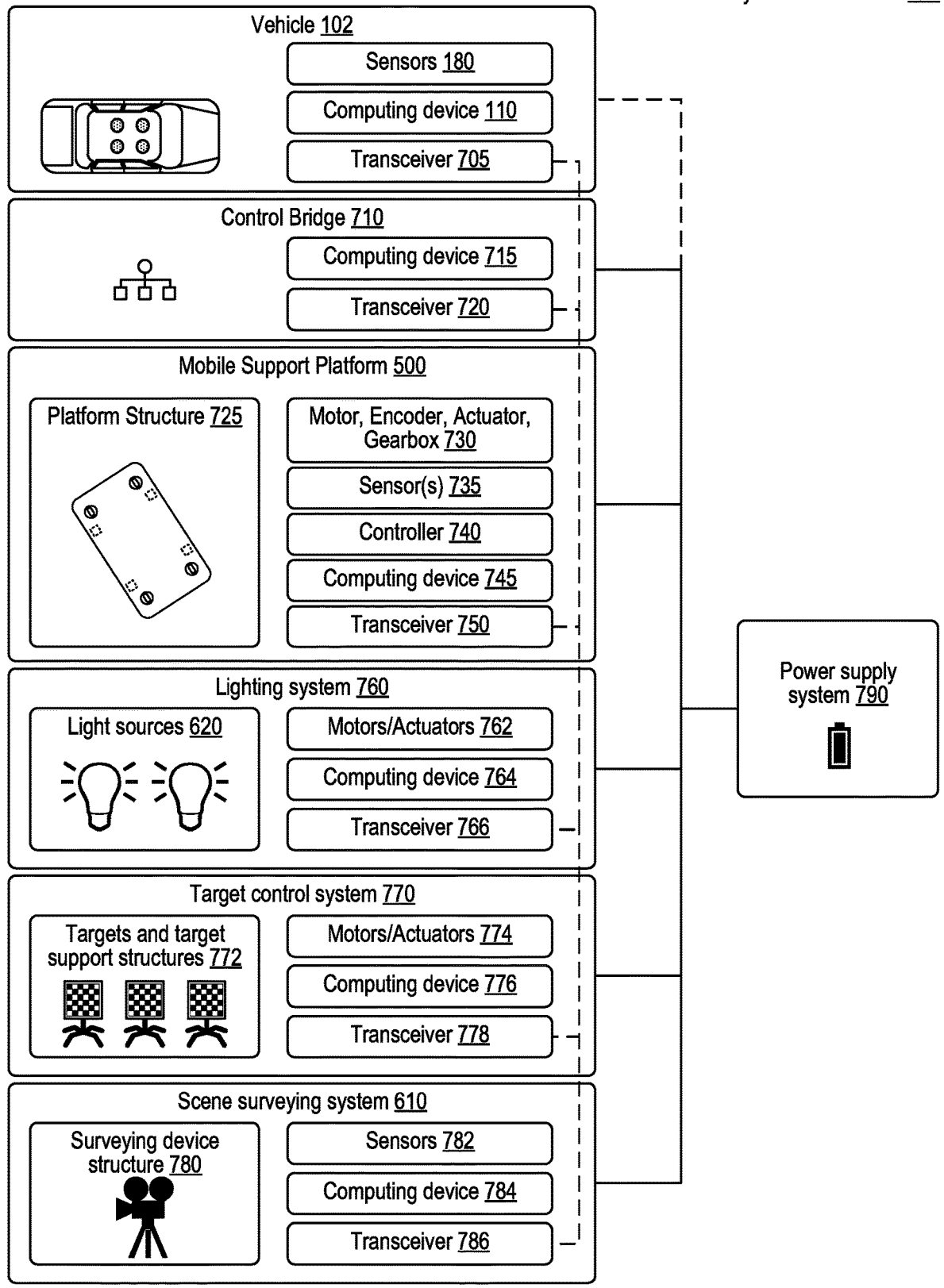
FIG. 7 illustrates a system architecture of a calibration environment, in accordance with various aspects of the subject technology.

FIG. 7 illustrates a system architecture of a calibration environment, in accordance with various aspects of the subject technology. The system architecture 700 of the calibration environment of FIG. 7 includes a number of main elements, each with sub-components. The main elements include the autonomous vehicle 102, a control bridge 710, the mobile support platform 500, a lighting system 760, a target control system 770, a scene surveying system 610, and a power supply system 790.

The autonomous vehicle 102 includes the one or more sensors 180, the one or more internal computing devices 110, one or more wireless transceivers 705 (integrated with communication service 116), and any other elements illustrated in and discussed with respect to FIG. 1.

The control bridge 710 includes one or more computing devices 715 and one or more wired and/or wireless transceivers 720. The control bridge 710 is optional, but can serve as a "middleman" or "router" between the autonomous vehicle 102 and the remaining main elements of the system architecture 700, such as the control bridge 710, the mobile support platform 500, the lighting system 760, the target control system 770, the scene surveying system 610, and the power supply system 790. The control bridge 710 can in some cases convert file formats, perform mathematical operations such as operation conversions, or otherwise interpret instructions or data as necessary so that the vehicle 120 can successfully communicate with other elements. In fact, the control bridge 710 can perform similar conversions, mathematical operations, or interpretations in its role as a middleman between any two or more devices of the architecture 700.

The mobile support platform 500 includes a platform structure 725 (e.g., a chassis, wheels, lift posts, etc.) as well as one or more motors, encoders, actuators, and/or gearboxes 730 for controlling the components of the platform structure 725. The mobile support platform 500 may include one or more sensors 735, such as pressure sensors, for example to identify whether or not the vehicle 102 is on the platform structure 725, whether or not the vehicle 102 is positioned correctly on the platform structure 725, or how the vehicle's weight is distributed generally or across the platform structure 725. The controller 740 may be used to control the actuation of the motors, encoders, actuators, and/or gearbox(es) 730, for example to control a speed, direction, rotation, acceleration and/or deceleration, or some combination thereof. The mobile support platform 500 includes one or more computing devices 745 and one or more wired and/or wireless transceivers 750, through which it may interact with the vehicle 102, the control bridge 710, or any other element in the architecture 700.

The lighting system 760 includes one or more light sources 620 and one or more motors and/or actuators 762 for activating or turning on each of the light sources 620, disabling or turning off each of the light sources 620, fading or dimming each of the light sources 620, brightening each of the light sources, or moving each of the light sources 620 with an actuated motor (e.g., to shine on a particular target). The lighting system 760 includes one or more computing devices 764 and one or more wired and/or wireless transceivers 766, through which it may interact with the vehicle 102, the control bridge 710, or any other element in the architecture 700.

The target control system 770 includes one or more targets and target support structure 772. The target support structures may include easel-type support structures, tripod-type support structures, or the rod-type support structures 410 with wide bases seen in FIG. 4 and FIG. 5. The target support structures may include any material discussed with respect to the substrate 205, such as paper, cardboard, plastic, metal, foam, or some combination thereof. In some cases, certain stands may be made of a plastic such polyvinyl chloride (PVC) to avoid detection by certain types of range sensors, such as radar, which detect metal better than plastic.

The targets and/or support structures 720 may in some cases be motorized, and as such, the target control system 770 may include motors and actuators 774 that it can use to move the targets, for example as requested by the vehicle 102 to optimize calibration. For example, the target support structures may include a robotic arm with ball joints and/or hinge joints that may be actuated using the motors and actuators 774 to translate a target in 3D space and/or to rotate a target about any axis. The motors and actuators 773 may alternately only control a single type of movement for a particular target, for example by enabling a target to rotate about the rod of a stand 410. The target support structure 772 may also include wheels or legs, which may be actuated by the motors 774 to enable the entire target support structure 772 to move, and with it, the target(s) it supports. The target control system 770 includes one or more computing devices 776 and one or more wired and/or wireless transceivers 778, through which it may interact with the vehicle 102, the control bridge 710, or any other element in the architecture 700.

The scene surveying system 610 includes a surveying device support structure 780, such as a tripod or any other structure discussed with respect to the target support structure 772, and one or more sensors 782 coupled to the support structure 780. The sensors 782 of the scene surveying system 610, like the sensors 180 of the vehicle 102, may include one or more cameras of any type (e.g., wide-angle lens, fisheye lens), one or more range sensors (e.g., radar, lidar, emdar, laser rangefinder, sonar, sodar), one or more infrared sensors, one or more microphones, or some combination thereof. Using these, the scene surveying system 610 can capture a representation of the entire dynamic scene, including the vehicle 102, allowing determination of distances between the vehicle 102 and various targets. In some cases, either the vehicle 102 or the scene surveying system 610 or both may request adjustment of lighting through the lighting system 760 and/or adjustment of target positioning via the target control system 770. The scene surveying system 610 includes one or more computing devices 784 and one or more wired and/or wireless transceivers 784, through which it may interact with the vehicle 102, the control bridge 710, or any other element in the architecture 700.

The power supply system 790 may include batteries, generators, or may plug into an outlet and into the power grid. The power supply system 790 may supply power to the various elements and components of the system architecture 700, including at least the control bridge 710, the mobile support platform 500, the lighting system 760, the target control system 770, and the scene surveying system 610. The power supply system 790 may also charge the vehicle 102 before, during, and/or after calibration, for example if the vehicle 102 is electric or hybrid. The power supply system 790 may also intelligently scale voltage, amperage, and current as appropriate for each element and component of the system architecture 700, and to do so it may include a computing system 1500 (not pictured). It may also include a wired and/or wireless transceiver (not pictured) through which it may interact with the vehicle 102, the control bridge 710, or any other element in the architecture 700. The computing devices 110, 715, 745, 764, 776, and 784 may each, at least in some cases, include at least one computing system or may include at least a subset of the components of a computing system.

Figure 8:
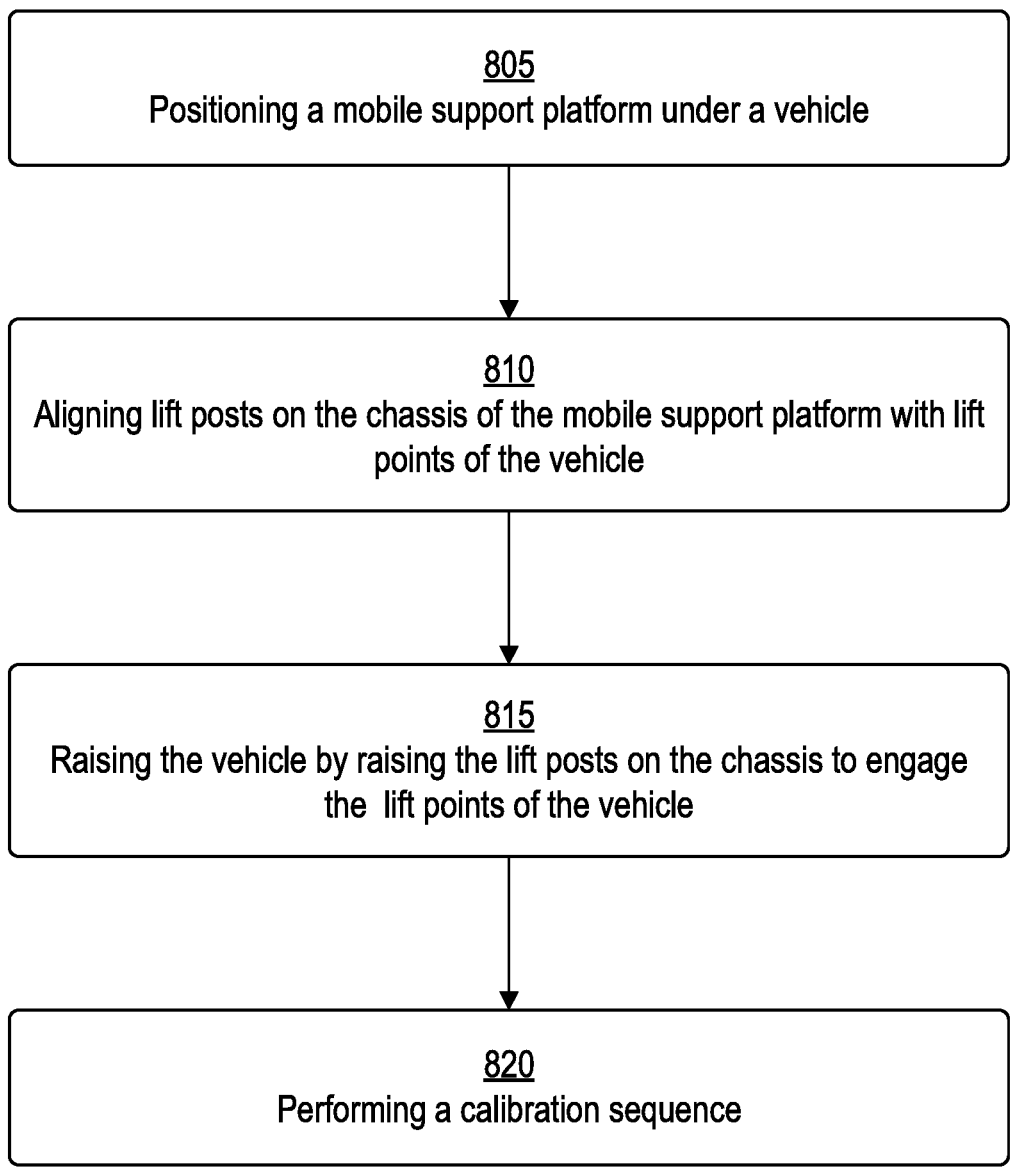
FIG. 8 is a flow diagram illustrating a method of performing calibration a calibration sequence using a mobile support platform, in accordance with various aspects of the subject technology.

FIG. 8 is a flow diagram illustrating a method of performing calibration a calibration sequence using a mobile support platform, in accordance with various aspects of the subject technology. The method may be performed by, for example, the mobile support platform 500 of FIG. 5 and/or other embodiments of a mobile support platform individually or in conjunction with other components of a calibration environment.

A mobile support platform is configured to locate a vehicle that includes sensors for calibration, approach the vehicle, and position itself underneath the vehicle at operation 805. The mobile support platform may perform these tasks with the help of a manual operator, sensors and cameras on the mobile support platform, on the autonomous vehicle, or in the calibration environment, and/or other components of the calibration environment.

At operation 810, the mobile support platform aligns the lift posts on the chassis of the support platform with lift points on the vehicle. In some cases, the lift points on the mobile support platform may be configured to be operable with one or more models of vehicles and placement of the lift posts of the mobile support platform are compatible with the placements of the lift points on the vehicle. In some embodiments, the lift posts on the mobile support platform are movable and the mobile support platform is configured to move the lift posts to a location on the chassis of the mobile support platform where the lift posts are aligned with the lift points of the vehicle. At operation 815, the mobile support platform may raise the vehicle by raising the lift posts on the chassis of the mobile support platform to engage the lift points of the vehicle.

At operation 820, the mobile support platform performs one or more calibration sequences. The calibration sequences may include one or more stages where the vehicle is moved through one or more calibration environments such as a hallway calibration environment (e.g., the hallway calibration environment 300 of FIG. 3), a dynamic scene calibration environment (e.g. the calibration environment 600 of FIG. 6), and/or other calibration environments. The calibration sequence may include moving the vehicle in a direction, accelerating or decelerating the vehicle, stopping the vehicle, turning the vehicle, rotating the vehicle, or moving the vehicle in any other manner. While the vehicle is moving and/or stopped, sensor and camera data may be collected by the various cameras and sensors in the calibration environment for calibration of the vehicle cameras and/or sensors. The calibration sequences may also involve transitioning the vehicle from one calibration stage to another. The transitioning may involve moving the vehicle from a queuing or waiting area to a calibration environment, from one calibration environment to another, and/or from a calibration environment to a waiting or completed area.

Accordingly, aspects of the subject technology provide for a mobile support platform that improves the calibration process for a vehicle, such as an autonomous vehicle. The mobile support platform may include a chassis, a set of wheels mounted to the chassis, lift posts on the chassis configured to interface with one or more lift points on a vehicle, and a controller configured to raise the vehicle via the lift posts and perform a calibration sequence. The mobile support platform enables vehicle calibration to be performed in a larger variety of environments (e.g., environments without level ground) and/or without having to engineer an environment to meet restrictive requirements. The mobile support platform also allows for greater control of the calibration process with fewer uncontrolled variables with or without transitioning through one or more stages of calibration. The greater control may allow for fewer mistakes in calibration, more accurate calibration, and fewer safety concerns. Additionally, the mobile support platform need not be attached to the ground like a turntable and, as a result, is much more portable and transportable. The mobile support platform may be packed up, shipped, and deployed faster, with less expense, and with less materials and support than other calibration methods. Furthermore, the mobile support platform increases the speed of calibration process by reducing roll on a vehicle, facilitating transitions from one calibration stage to another, and allowing for multiple support platforms to operate simultaneously so that multiple vehicles may be put through the calibration process at the same time (e.g., at different stages of the calibration process).

Figure 9:
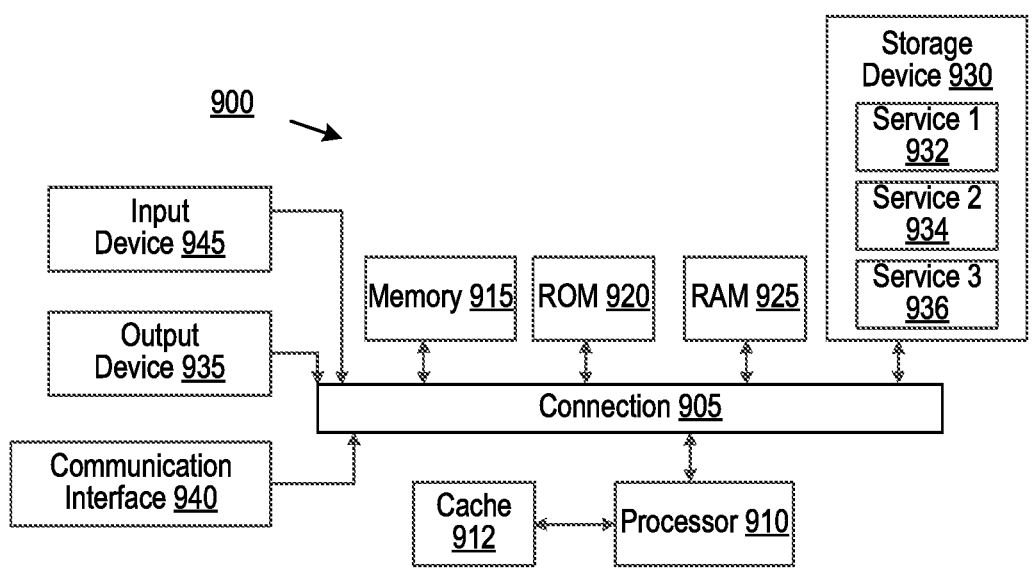
FIG. 9 shows an example of computing system 900, in accordance with various aspects of the subject technology.

FIG. 9 shows an example of computing system 900, which can be for example any computing device making up internal computing system 110, remote computing system 150, potential passenger device executing rideshare app 170, or any component thereof in which the components of the system are in communication with each other using connection 905. Connection 905 can be a physical connection via a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, such as read-only memory (ROM) 920 and random access memory (RAM) 925 to processor 910. Computing system 900 can include a cache of high-speed memory 912 connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A calibration system comprising:
    a chassis of a mobile support platform, wherein the mobile support platform is operable to be redeployed in different locations;
    a set of wheels mounted to the chassis;
    a plurality of lift posts on the chassis configured to interface with a plurality of lift points on a vehicle; and
    a controller configured to perform operations comprising:
        raising the vehicle by raising the plurality of lift posts on the chassis to engage the plurality of lift points of the vehicle;
        performing a calibration sequence by operating the set of wheels; and
        controlling a roll of the vehicle during the calibration sequence by the plurality of lift posts.

2. The calibration system of claim 1, wherein the controller is further configured to perform operations comprising aligning the plurality of lift posts on the chassis with the plurality of lift points on the vehicle.

3. The calibration system of claim 1, wherein the calibration sequence comprises moving the vehicle through a number of positions.

4. The calibration system of claim 1, wherein the calibration sequence comprises moving the vehicle from a first calibration stage to a second calibration stage.

5. The calibration system of claim 1, wherein the controller is further configured to perform operations comprising aligning the plurality of lift posts on the chassis with the plurality of lift points on the vehicle.

6. The calibration system of claim 1, further comprising a transceiver configured to communicate with other components of the calibration environment.

7. The calibration system of claim 1, further comprising one or more sensors of the mobile support platform.

8. The calibration system of claim 1, wherein the controller is further configured to receive instructions from at least one of a control bridge or the vehicle.

9. The calibration system of claim 1, wherein the controller is on the mobile support platform.

10. A mobile support platform operable to be redeployed in different locations, the mobile support platform comprising:
    a chassis;
    a plurality of lift posts on the chassis, wherein the plurality of lift posts are configured to interface with a plurality of lift points on a vehicle and raise the vehicle, and wherein the plurality of lift posts are further configured to control a roll of the vehicle during a calibration sequence; and
    a set of wheels mounted to the chassis, wherein the set of wheels are configured to carry the vehicle through the calibration sequence.

11. The mobile support platform of claim 10, further comprising a controller configured to transmit instructions to at least one of the plurality of lift posts to raise the vehicle or the set of wheels to perform the calibration sequence.

12. A method of calibrating a vehicle, the method comprising:
    raising a plurality of lift posts on a mobile support platform to engage a plurality of lift points of a vehicle and raise the vehicle in a first location, the vehicle comprising a set of sensors, wherein the mobile support platform is operable to be redeployed in a second location;
    operating a set of wheels on the mobile support platform to move the vehicle through a calibration sequence for the sensors; and
    controlling a roll of the vehicle during the calibration sequence by the plurality of lift posts.

13. The method of claim 12, further comprising:
    positioning the mobile support platform under the vehicle; and
    aligning the plurality of lift posts with the plurality of lift points of the vehicle.

14. The method of claim 13, wherein the plurality of lift posts are aligned with the plurality of lift points using a set of sensors on the mobile support platform.

15. The method of claim 12, further comprising transitioning the vehicle from a first calibration stage to a second calibration stage.

16. The method of claim 12, further comprising moving the vehicle through a number of calibration positions.

17. The method of claim 12, wherein the calibration sequence comprises performing a zero point rotation of the vehicle.

18. The method of claim 12, further comprising receiving calibration instructions from at least one of a control bridge or the vehicle.

19. The method of claim 12, further comprising locating the vehicle in a queuing area using a set of sensors on the mobile support platform.

20. The method of claim 12, further comprising:
    navigating to a completion area upon completion of the calibration sequence; and
    placing the vehicle in the completion area by lowering the plurality of lift posts on the mobile support platform to lower the vehicle.

* * * * *